United States Patent

Klee

[11] Patent Number: 5,842,331
[45] Date of Patent: Dec. 1, 1998

[54] ROTARY WIRE BRUSH WEED REMOVER

[76] Inventor: Edward F. Klee, 855 Mohawk Dr., Ukiah, Calif. 95482

[21] Appl. No.: 899,731

[22] Filed: Jul. 24, 1997

[51] Int. Cl.[6] ............................. A01D 34/43; A01D 15/00
[52] U.S. Cl. ....................... 56/16.9; 56/256; 56/DIG. 12; 172/14; 172/15
[58] Field of Search ......................... 56/16.9, 1, DIG. 17, 56/DIG. 20, DIG. 12, 256; 172/13, 14, 15, 17, 20, 42, 43

[56] References Cited

U.S. PATENT DOCUMENTS

| | | | |
|---|---|---|---|
| 2,706,941 | 4/1955 | Swanson. | |
| 2,708,335 | 5/1955 | Newton | 56/16.9 |
| 3,006,421 | 10/1961 | Feilback | 172/15 |
| 3,812,917 | 5/1974 | Strate | 172/15 |
| 5,497,606 | 3/1996 | Baxter | 56/16.9 |
| 5,540,286 | 7/1996 | Helmig | 172/15 |

Primary Examiner—Heather Shackelford
Attorney, Agent, or Firm—Jack Lo

[57] ABSTRACT

A weed remover includes a pivoting arm connected to a wheeled chassis, and a rotary wire brush attached to the forward end of the pivoting arm. A belt is positioned to encircle a wire brush pulley coaxial with the wire brush, and a drive pulley driven by a motor. The wire brush can be raised off the ground or lowered to engage it by moving a lever connected to the pivoting arm. When the wire brush is in the raised position, the pulleys are close together and the belt is relaxed, so that the belt is disengaged from the pulleys, and the wire brush is deactivated. When the wire brush is in the lowered position, the pulleys are moved apart, and the drive belt is pulled taut therebetween, so that drive is transferred to the wire brush. The wire brush is spun at high speed to remove weeds growing from cracks on a hard ground surface, such as a sidewalk or driveway. The wire brush is stiff enough to remove the weeds flush to the ground surface, but compliant enough to not harm the ground surface.

4 Claims, 3 Drawing Sheets

ROTARY WIRE BRUSH WEED REMOVER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field Of The Invention

This invention relates generally to power tools for trimming or cutting plants.

2. Prior Art

Common gardening power tools include trimmers and edgers. A typical trimmer includes a flexible plastic cord spun at high speed about a vertical axis for cutting grass to a desired height around obstacles, such as trees and fences, without harming the obstacles. A typical edger includes a rigid rotating blade spun about a horizontal axis for cutting the edge of a lawn. Neither trimmers nor edgers are suitable for removing weeds that are frequently found growing from cracks in concrete or asphalt driveways and sidewalks. A trimmer includes a spinning hub that extends slightly below the level of the cord, so that the hub will tend to rub against the ground and deflect the trimmer when the trimmer is lowered to cut the weed flush to the ground. An edger uses a rigid steel blade, which will harm the concrete or asphalt surface.

OBJECTS OF THE INVENTION

Accordingly an object of the present invention is to provide a weed remover that easily removes weeds from cracks in hard surfaces.

Another object of the present invention is to provide a weed remover that removes weeds flush to the ground.

Another object of the present invention is to provide a weed remover with a rotary wire brush that can be activated or deactivated independently of a drive motor.

Yet another object of the present invention is to provide a weed remover with a rotary wire brush that can be lowered or raised for engaging or disengaging from the ground, so that it can be used for treating only desired areas, and prevented from contacting areas where treatment is not desired.

Further objects of the present invention will become apparent from a consideration of the drawings and ensuing description.

BRIEF SUMMARY OF THE INVENTION

A weed remover includes a pivoting arm attached to a wheeled chassis, and a rotary wire brush mounted on the forward end of the pivoting arm. A drive belt is positioned to encircle a pulley coaxial with the rotary wire brush, and a drive pulley driven by a motor. The wire brush can be raised off the ground or lowered to engage it by moving a lever connected to the pivoting arm. When the wire brush is in the raised position, the pulleys are close to each other and the drive belt is relaxed, so that the belt is disengaged from the pulleys, and the wire brush is deactivated. When the wire brush is in the lowered position, the pulleys are moved apart, and the drive belt is stretched taut therebetween, so that drive is transferred to the wire brush. The wire brush is spun at high speed to remove weeds growing from cracks on a hard ground surface, such as a sidewalk or driveway. The wire brush is stiff enough to remove the weeds flush to the ground surface, but compliant enough to not harm the ground surface.

DRAWING REFERENCE NUMERALS

10. Power Edger 11. Edger Blade
12. Edger Drive Belt 13. Edger Drive Pulley
14. Output Shaft 15. Motor
16. Wheeled Chassis 17. Wheels
18. Bracket 19. Connecting Rod
20. Box Member 21. Power Transfer Assembly
22. Bearings 23. Shaft
24. Wire Brush Drive Pulley 25. Pulley
26. Pulley 27. Belt
28. Rotary Wire Brush 29. Hub
30. Arm 31. Spring
32. Pulley 33. Shaft
34. Safety Shield 35. Wire Brush Drive Belt
36. Retaining Bracket 37. Weed
38. Crack On Ground 39. Bracket
40. Pivot 41. Connecting Rod
42. Handlebar 43. Handlebar
44. Control Assembly 45. Lever
46. Vertical Plate 47. Nub
48. Detents 49. Safety Shield

DETAILED DESCRIPTION OF THE INVENTION

Figure 1:
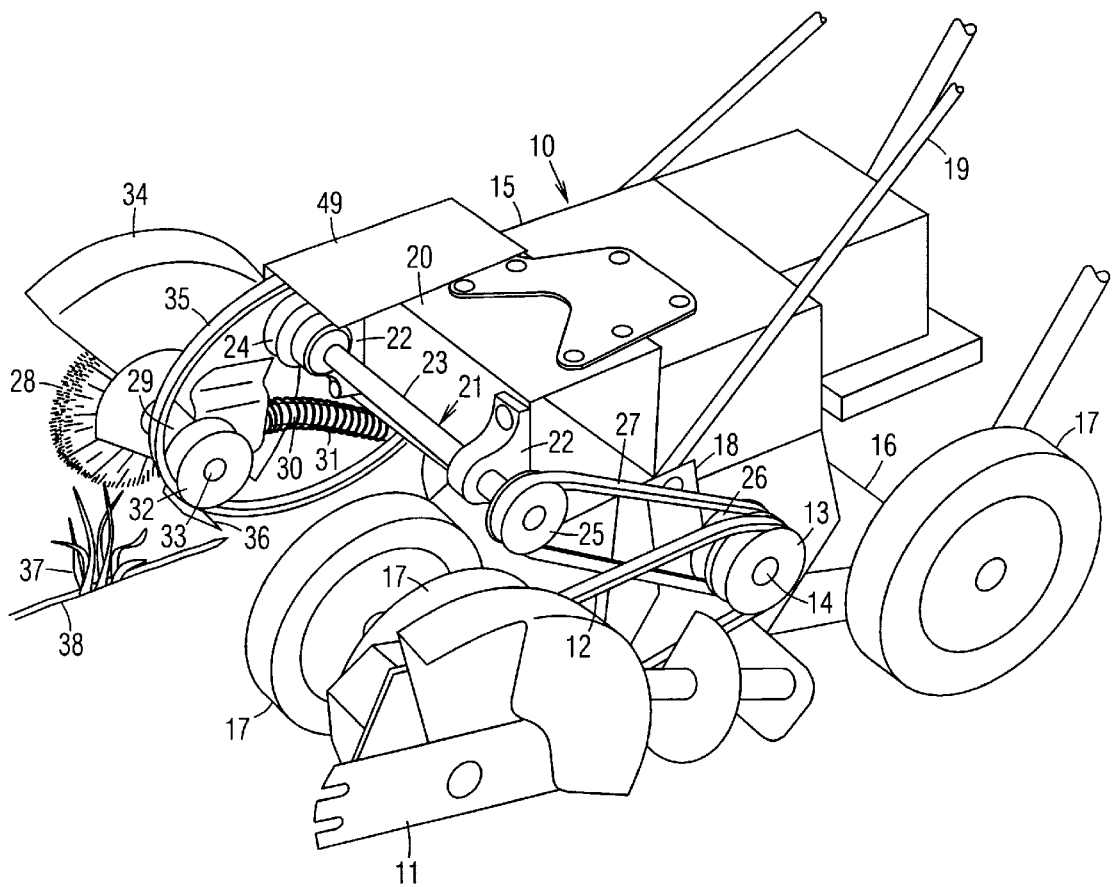
FIG. 1 is a left-front perspective view of a rotary wire brush weed remover.

FIG. 1:

In accordance with a preferred embodiment of the invention shown in the left-front perspective view of FIG. 1, a weed remover includes a conventional power edger 10 with a rotary edger blade 11 arranged on a left side thereof. Edger blade 11 is driven by a belt 12 and a pulley 13 attached to an output shaft 14 of a motor 15. Power edger 10 includes a wheeled chassis 16 with wheels 17. Edger blade 11 is pivotally attached to chassis 16 by a bracket 18, so that edger blade 11 can be lowered or raised for engaging or disengaging from a lawn by moving a lever (not shown) attached to a connecting rod 19.

Conventional power edger 10 is modified by having a box member 20 attached to the front of motor 15. A power transfer assembly 21 is attached to the front of box member 20. Power transfer assembly 21 includes a pair of bearings 22 attached to box member 20, a shaft 23 extending through bearings 22, and pulleys 24 and 25 attached to opposite ends of shaft 23. A pulley 26 is attached to output shaft 14 of motor 15, and a power transfer belt 27 is connected between pulleys 25 and 26. Pulley 24 is thus driven constantly by motor 15.

A rotary wire brush 28 is attached to a hub 29, which is slidably attached to the forward end of a tubular arm 30 on the right side of power edger 10. The axis of hub 29 is orthogonal to arm 30. A spring 31 is coaxially positioned along arm 30 for biasing hub 29 forwardly. A pulley 32 is attached to the inner end of a horizontal axle 33 of wire brush 28. A safety shield 34 is attached to hub 29, and positioned over the top of wire brush 28. A belt 35 is positioned to encircle pulleys 24 and 32. Another safety shield 49 is attached to box member 20, and positioned over pulley 24.

Wire brush 28 may be raised from the ground or lowered to engage it by pivoting arm 30, which is pivotally attached to chassis 16 at its rear end. As shown, wire brush 28 is in the raised position, and belt 35 is in a relaxed position. A retaining bracket 36 is attached to hub 29 and closely positioned under pulley 32 to prevent belt 35 from falling off. Belt 35 is also lifted by bracket 36 and caused to disengage from pulley 24, so that wire brush 28 is deactivated, even if motor 15 is operating and pulley 24 is rotating. Wire brush 28 is positioned over weeds 37 growing from a crack 38 on a hard ground surface, such as a sidewalk or driveway.

Figure 2:
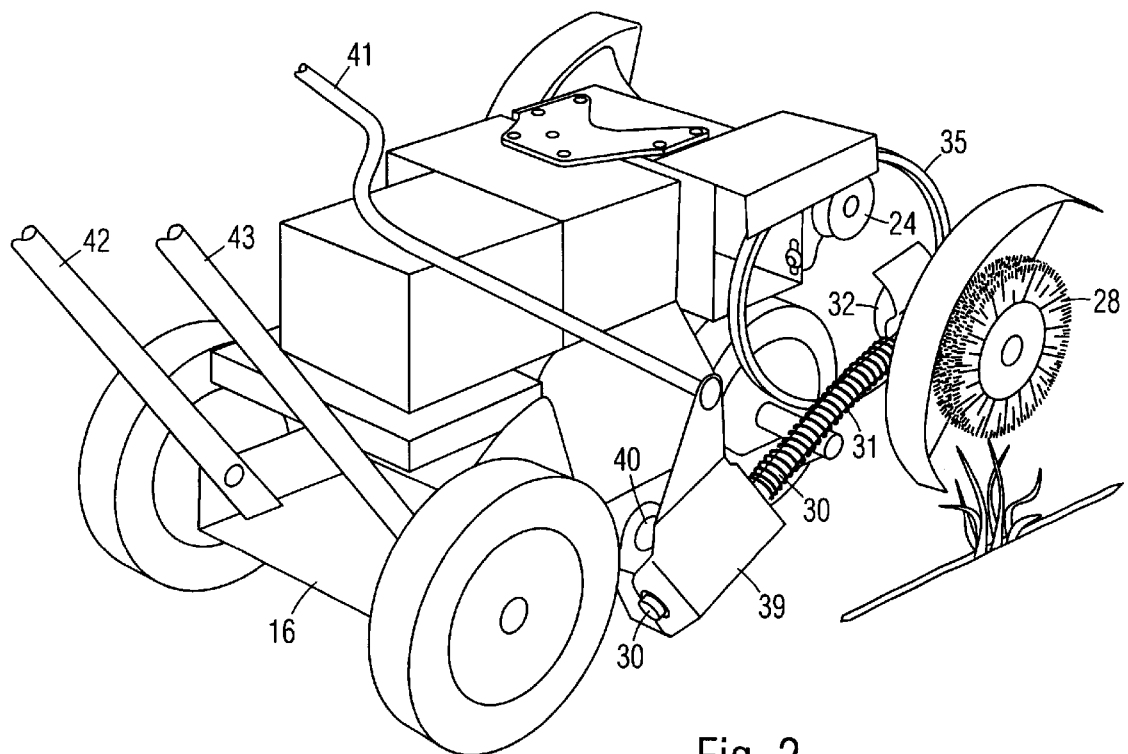
FIG. 2 is a right-rear perspective view of the weed remover when deactivated.

FIG. 2:

The weed remover is shown in a right-rear view in FIG. 2. The rear end of arm 30 is slidably attached to a bracket 39, which is pivotally attached to chassis 16 about a horizontal pivot 40. A connecting rod 41 is pivotally attached to the top of bracket 39, so that wire brush 28 can be raised or lowered by pulling or pushing on connecting rod 41. Handlebars 42 and 43 extend rearward and upward from chassis 16.

Figure 3:
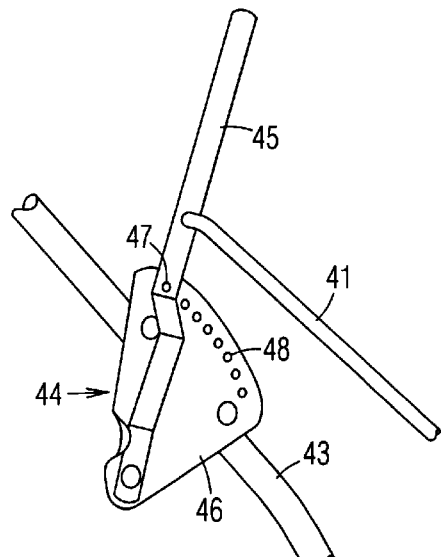
FIG. 3 is a right-rear perspective view of a control assembly of the weed remover.

FIG. 3:

A control assembly 44 of the weed remover is shown in a right-rear view in FIG. 3. Control assembly 44 is attached to handlebar 43, and includes a lever 45 having a lower end pivotally attached to the lower end of a vertical plate 46. A nub 47 protruding from lever 45 is arranged to selectively engage one of a series of detents 48 on plate 46. The top end of connecting rod 41 is pivotally attached to an intermediate portion of lever 45. Moving lever 45 thus raises or lowers wire brush 28 (FIG. 2).

Figure 4:
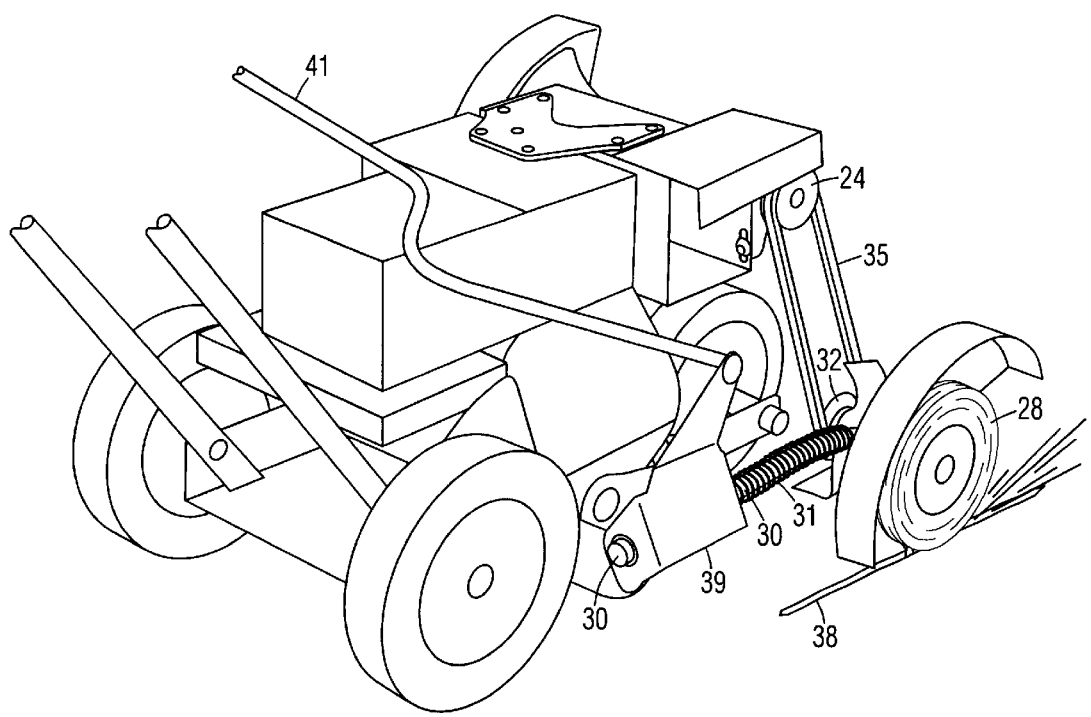
FIG. 4 is a right-rear perspective view of the weed remover when activated.

FIG. 4:

The weed remover is shown in a right-rear view in FIG. 4. When lever 45 (FIG. 3) is pushed down, bracket 39 is pivoted by connecting rod 41, and wire brush 28 is lowered to meet the ground as shown. Belt 35 is pulled taut between pulleys 24 and 32, so that drive is transmitted to wire brush 28, which is spun at high speed to remove the weeds flush to crack 38. Pulley 24 is positioned slightly rearward of pulley 32, so that hub 29 (FIG. 1) is pulled rearward by belt 35. Spring 31 is thus compressed to maintain belt 35 in tension for proper power transmission. Wire brush 28 is stiff enough to remove the weeds cleanly, but is compliant enough to prevent harming the ground surface. When one clump of weeds has been removed, wire brush 28 can be raised, and the weed remover can be wheeled to another clump of weeds before wire brush 28 is lowered again, so that wire brush 28 is prevented from contacting areas where treatment is not desired.

SUMMARY AND SCOPE

Accordingly, I have provided a weed remover that easily and quickly removes weeds from cracks in hard surfaces. It cleanly removes weeds flush to the ground surface. It can be or deactivated independently of the drive motor. It can be lowered or raised for engaging or disengaging from the ground, so that it can be used for treating only the desired areas, and prevented from contacting areas where treatment is not desired.

Although the above descriptions are specific, they should not be considered as limitations on the scope of the invention, but only as examples of the embodiments. Many substitutes and variations are possible within the teachings of the invention. For example, rotary wire brush 28 and edger 11 may be arranged on either side of chassis 16. Rotary wire brush 28 may include bristles made of various materials, including but not limited to steel and plastic. Edger 11 may be eliminated. Instead of wheeled chassis 16, rotary wire brush 28 may be attached to the end of a hand-held boom, and raised or lowered to the ground simply by lifting or lowering the boom. Rotary wire brush 28 may be positioned on the same side as output shaft 14 of motor 15, and power transfer assembly 21 may be eliminated. Arm 30 may be pivoted about the axis of pulley 24, so that belt 35 is maintained in tension between pulleys 24 and 32 at all times, and rotary wire brush 28 is driven in both the lowered and raised positions. Wire brush 28 may be connected to motor 15 by a geared transmission or a clutch instead of belt 35. Motor 15 may be an electric motor or an internal combustion engine. Therefore, the scope of the invention should be determined by the appended claims and their legal equivalents, not by the examples given.

I claim:

1. A weed remover, comprising:

a wheeled chassis;

a motor attached to said wheeled chassis;

a rotary edger attached to a bracket hinged to one side of said wheeled chassis, said rotary edger being connected to said motor and movable from a raised position to a lowered position for edging a lawn; and a rotary wire brush attached to an arm hinged to another side of said wheeled chassis, said rotary wire brush being connected to said motor and movable from a raised position to a lowered position for removing weeds from a pavement without harming said pavement, said rotary edger and said rotary wire brush being movable up and down independently to engage said pavement one at a time.

2. A weed remover, comprising:

a wheeled chassis having a front and a rear;

a motor attached to said wheeled chassis;

a drive pulley connected to said motor;

a generally horizontal pivoting arm having a proximal end pivotally connected to said wheeled chassis at a position behind said drive pulley, said pivoting arm having a distal end movably positioned under said drive pulley;

a rotary wire brush rotatably attached to said distal end of said pivoting arm;

a wire brush pulley coaxially attached to said rotary wire brush and positioned under said drive pulley, said wire brush pulley being movable with said pivoting arm between a raised position closer to said drive pulley and a lowered position farther from said drive pulley; and a belt encircling said drive pulley and said wire brush pulley, when said pivoting arm is raised and said wire brush pulley is positioned closer to said drive pulley, said belt is relaxed and disengaged from said wire brush pulley so that said rotary wire brush is deactivated, and when said pivoting arm is lowered and said wire brush pulley is positioned farther from said drive pulley, said belt is pulled taut and drive is transferred to said wire brush pulley, so that said rotary wire brush is activated for removing weeds growing from a pavement without harming said pavement.

3. The weed remover of claim 2, further including a pivoting bracket pivotally attached to said wheeled chassis, said proximal end of said pivoting arm slidably attached to said pivoting bracket, and a coiled spring coaxial with said pivoting arm urging said pivoting arm forwardly toward said distal end thereof, said coiled spring maintaining said belt in tension when said pivoting arm is lowered.

4. A weed remover, comprising:

a wheeled chassis;

a motor attached to said wheeled chassis;

a pair of drive pulleys, one of said drive pulleys being attached to said motor;

a power transfer assembly extending transversely between opposite sides of said wheeled chassis, said power transfer assembly having one end driven by said motor, another one of said drive pulleys being attached to another end of said power transfer assembly;

a rotary edger attached to a bracket hinged to one side of said wheeled chassis, said rotary edger being connected to one of said drive pulleys and movable from a raised position to a lowered position for edging a lawn; and a rotary wire brush attached to an arm hinged to another side of said wheeled chassis, said rotary wire brush being connected to another one of said drive pulleys and movable from a raised position to a lowered position for removing weeds from a pavement without harming said pavement, said rotary edger and said rotary wire brush being movable up and down independently to engage said pavement one at a time.

\* \* \* \* \*